Figure 1:
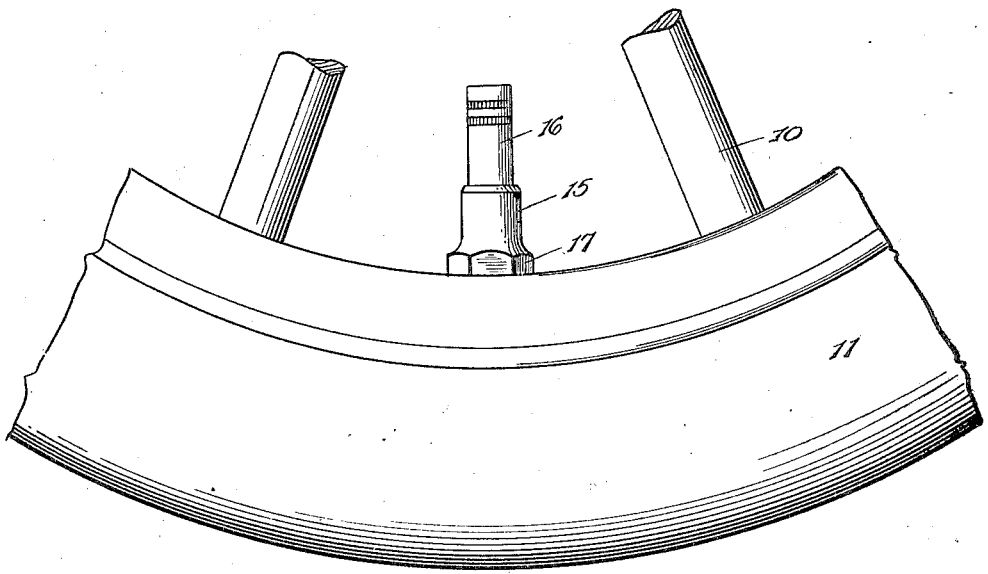

Apr. 17, 1923.

T. J. STEPHENS 1,451,719

DUST CAP FOR TIRE VALVES

Filed Dec. 21, 1921

Inventor
T. J. Stephens.

By Lacy & Lacy, Attorneys

Patented Apr. 17, 1923.

1,451,719

UNITED STATES PATENT OFFICE.

THOMAS JEFFERSON STEPHENS, OF SPOKANE, WASHINGTON.

DUST CAPS FOR TIRE VALVES.

Application filed December 21, 1921. Serial No. 523,985.

*To all whom it may concern:*

Be it known that I, THOMAS JEFFERSON STEPHENS, citizen of the United States, residing at Spokane, in the county of Spokane and State of Washington, have invented certain new and useful Improvements in Dust Caps for Tire Valves, of which the following is a specification.

This invention relates to an improved tire valve cap and seeks, as one of its principal objects, to provide a cap which may be easily and quickly removed or replaced.

A further object of the invention is to provide a cap comprising companion sections one of which will provide a felly nut.

A still further object is to provide a cap wherein the other of the sections thereof will form a closure for the valve casing.

Another object is to provide a cap wherein the latter section thereof will act in the capacity of a valve for preventing escape of air through the valve casing.

And the invention has as a still further object to provide a dust cap which will be neat and attractive in appearance and which may be readily employed in conjunction with the usual tire valve casings.

Other and incidental objects will appear hereinafter.

Figure 2:
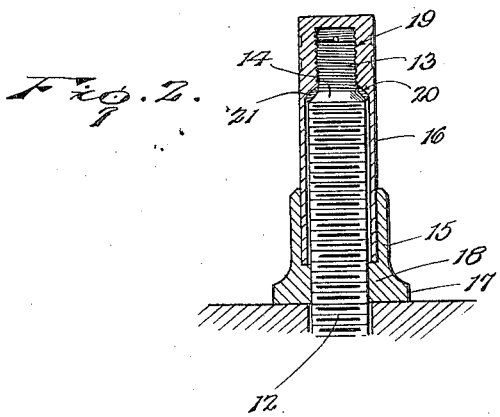

In the drawing:

Figure 1 is a fragmentary side elevation showing my improved dust cap in conjunction with a conventional motor vehicle wheel and tire, and Figure 2 is a fragmentary sectional view more particularly illustrating the structural details of the device.

Referring now more particularly to the drawing, I have, for convenience, shown my improved dust cap in connection with a conventional motor vehicle wheel 10 and tire 11, the usual tire valve casing which projects through the wheel felly being indicated at 12. As is customary, this casing is provided at its upper end with a reduced nipple 13 at the base of which is an annular beveled shoulder 14. In carrying the invention into effect, I form my improved dust cap of mating telescopic sections 15 and 16 respectively, the section 16 snugly but freely fitting in the section 15. The section 15 is flared at its lower end and provided with angular faces, as indicated at 17, and is further formed with a bottom wall 18 through which is provided a threaded bore to accommodate the casing 12. Thus, the section 15 provides a nut which may be threaded upon the valve casing in the usual manner to coact between such casing and the wheel felly. At the upper end of the section 16, the wall thereof is thickened to define an axial screw threaded socket 19 as well as to also provide an internal annular beveled shoulder 20 at the mouth of the socket and overlying said shoulder is an appropriate gasket 21. As will be observed, the socket 19 is formed to coact with the nipple 13 of the valve casing while the gasket 21 is disposed to coact with the shoulder 14 of the casing. Accordingly, the cap section 16 may be applied by simply threading this section upon the nipple 13, the lower end of said section being received in the section 15 so that the two sections will thus coact for effectually excluding dust. At the same time, the section 16 may be adjusted to compress the gasket 21 between the shoulders 14 and 20 to provide an air tight joint between the valve casing and the cap section 16. Thus, this cap section will not only form a closure cap for the valve casing, supplanting the usual closure cap therefor, but will also function as a valve for preventing escape of air from the casing. I accordingly provide a particularly efficient device for the purpose set forth, the device supplanting both the usual felly nut as well as the usual valve casing cap. As will be perceived, the cap section 16 may be readily removed to permit access to the valve casing while the section 15 is formed to provide a relatively wide joint between the sections to thus compensate for any variation in the length of different valve casings. Preferably, the section 16 is provided near its upper end with milled or roughened bands so that said section may be readily grasped and rotated.

Having thus described the invention, what is claimed as new is:

In a dust cap for tire valves, the combination with a valve casing provided at its upper end with a reduced nipple and formed at the base of said nipple with a beveled shoulder, of mating telescopic cap sections one providing a nut threaded upon said casing and the other snugly fitting in said nut next to the casing and having the wall thereof thickened at its upper end to provide a reduced internal axial socket having threaded engagement with said nipple, the thickened portion of said wall being cut away at the mouth of said socket to define an internal beveled shoulder, and a gasket resting upon the latter shoulder to overlie said first mentioned shoulder, the latter section being adjustable upon the nipple for binding the gasket between said shoulders forming a sealed joint between the latter section and the casing.

In testimony whereof I affix my signature.

THOMAS JEFFERSON STEPHENS. [L. S.]